United States Patent
Somasundaram et al.

(10) Patent No.: US 9,467,911 B2
(45) Date of Patent: Oct. 11, 2016

(54) MOBILITY PROCEDURES AND DIFFERENTIATED CHARGING IN HOME NODE-BS

(75) Inventors: Shankar Somasundaram, Deer Park, NY (US); Rajat P. Mukherjee, Montreal (CA); Ulises Olvera-Hernandez, Kirland (CA); Mohammed Sammour, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 1296 days.

(21) Appl. No.: 12/110,733

(22) Filed: Apr. 28, 2008

(65) Prior Publication Data
US 2008/0293419 A1 Nov. 27, 2008

Related U.S. Application Data

(60) Provisional application No. 60/914,865, filed on Apr. 30, 2007, provisional application No. 60/939,932, filed on May 24, 2007.

(51) Int. Cl.
| H04W 8/18 | (2009.01) |
| H04W 48/20 | (2009.01) |
| H04W 36/04 | (2009.01) |

(Continued)

(52) U.S. Cl.
CPC .............. *H04W 36/04* (2013.01); *H04M 15/43* (2013.01); *H04M 15/7657* (2013.01); *H04M 15/80* (2013.01); *H04M 15/8027* (2013.01); *H04M 15/8033* (2013.01); *H04M 2215/74* (2013.01); *H04M 2215/7428* (2013.01); *H04M 2215/7435* (2013.01); *H04W 4/02* (2013.01);

(Continued)

(58) Field of Classification Search
CPC ........... H04M 15/7657; H04M 15/80; H04M 15/8027; H04M 15/8033; H04M 2215/74
USPC ......... 455/437, 439, 440, 436, 444; 370/328
See application file for complete search history.

(56) References Cited

U.S. PATENT DOCUMENTS

| 6,529,491 B1 | 3/2003 | Chang et al. |
| 7,110,765 B2 | 9/2006 | Amerga et al. |

(Continued)

FOREIGN PATENT DOCUMENTS

| EP | 1 772 994 | 4/2007 |
| GB | 2285556 A1 | 7/1995 |

(Continued)

OTHER PUBLICATIONS

European Telecommunications Standards Institute, "Digital Cellular Telecommunications System (Phase 2+); Generic Access to teh A/Gb Interface; Stage 2 (3GPP TS 43.318 Version 6.9.0 Release 6)", ETSI TS 143 318, V6.9.0, (Mar. 2007).

(Continued)

*Primary Examiner* — Ariel Balaoing
(74) *Attorney, Agent, or Firm* — Quasim A. Shah

(57) ABSTRACT

A method and apparatus for implementing Idle and Connected Mode mobility to and from a Home evolved Node-B (HNB) in a wireless environment. Methods to implement differentiated charging when accessing HNBs, as well as the criteria used to make a cell reselection decision when an HNB is detected, criteria for making a handoff decision and methods to indicate charging and other policies/preferences and configurations to a wireless transmit/receive unit (WTRU).

18 Claims, 8 Drawing Sheets

(51) Int. Cl.
    *H04M 15/00*     (2006.01)
    *H04W 4/02*      (2009.01)
    *H04W 84/04*     (2009.01)

(52) U.S. Cl.
    CPC .............. *H04W 8/18* (2013.01); *H04W 48/20* (2013.01); *H04W 84/045* (2013.01)

(56) References Cited

U.S. PATENT DOCUMENTS

| | | | |
|---|---|---|---|
| 7,133,702 | B2 | 11/2006 | Amerga et al. |
| 2002/0058481 | A1* | 5/2002 | Mohebbi .................. 455/67.1 |
| 2002/0197992 | A1* | 12/2002 | Nizri ................. H04W 60/04 455/435.1 |
| 2003/0040311 | A1* | 2/2003 | Choi ........................ 455/434 |
| 2004/0043798 | A1* | 3/2004 | Amerga et al. ............. 455/574 |
| 2006/0002345 | A1* | 1/2006 | Lapraye ..................... 370/331 |
| 2006/0025127 | A1* | 2/2006 | Cromer et al. ........... 455/432.1 |
| 2006/0025151 | A1* | 2/2006 | Karaoguz et al. .......... 455/455 |
| 2006/0035662 | A1* | 2/2006 | Jeong et al. ............... 455/525 |
| 2006/0221919 | A1* | 10/2006 | McRae et al. ............. 370/338 |
| 2007/0097938 | A1 | 5/2007 | Nylander et al. |
| 2007/0097939 | A1 | 5/2007 | Nylander et al. |
| 2008/0049702 | A1* | 2/2008 | Meylan et al. ............. 370/342 |
| 2008/0220784 | A1 | 9/2008 | Somasundaram et al. |
| 2008/0227453 | A1 | 9/2008 | Somasundaram et al. |
| 2008/0240439 | A1 | 10/2008 | Mukherjee et al. |
| 2009/0274086 | A1 | 11/2009 | Petrovic et al. |

FOREIGN PATENT DOCUMENTS

| | | |
|---|---|---|
| JP | 2005-537752 | 12/2005 |
| JP | 2010-506446 | 2/2010 |
| WO | WO-2004/021731 | 3/2004 |
| WO | WO-2006/014092 | 2/2006 |
| WO | 2006/056069 | 6/2006 |
| WO | WO-2006/056069 | 6/2006 |
| WO | 2006133720 A1 | 12/2006 |
| WO | WO-2006/133720 | 12/2006 |
| WO | 2007040454 A2 | 4/2007 |
| WO | WO-2007/040454 | 4/2007 |

OTHER PUBLICATIONS

China Mobile et al., "Mobility and Access Control Requirements for LTE Home-eNodeB," 3GPP TSG RAN WG3 #55bis, R3-070674 (Mar. 27-30, 2007).
Ericsson, "LTE Home NB Text Proposal", 3GPP TSG RAN WG3 Meeting #55bis, R3-070714, (St Julian's, Malta, Mar. 27-30, 2007).
Ericsson, "Home NB Scenario," 3GPP TSG RAN WG3 Meeting #55bis, R3-070637 (Mar. 27-30, 2007).
European Telecommunications Standards Institute, "Digital Cellular Telecommunications System (Phase 2+); Generic Access to the A/Gb Interface; Stage 2 (3GPP TS 43.318 Version 6.9.0 Release 6)", ETSI TS 143 318, V6.9.0, (Mar. 2007).
LAN Man Standards Committee of the IEEE Computer Society, "Draft Standard for Local and Metropolitan Area Networks: Media Independent Handover Services", IEEE P802.21/D05.00, (Apr. 2007).
Mitsubishi Electric, "Restricted and Opened Home NodeBs (HNBs)", 3GPP TSG RAN WG3 Meeting #56, R3-070781, (Kobe, Japan, May 7-11, 2007).
Orange et al., "Requirements for LTE Home eNodeBs," 3GPP TSG RAN #35, RP-070209 (Mar. 6-9, 2007).
Third Generation Partnership Project, "Technical Specification Group Services and System Aspects; Requirements for Evolved UTRA (E-UTRA) and Evolved UTRAN (E-UTRAN) (Release 7)", 3GPP TR 25.913 V7.3.0 (Mar. 2006).
Third Generation Partnership Project, "Technical Specification Group Services and System Aspects; 3GPP System Architecture Evolution: Report on Technical Options and Conclusions (Release 7)", 3GPP TR 23.882 V1.8.0 (Mar. 2006).
Third Generation Partnership Project, "Technical Specification Group Services and System Aspects; 3GPP System Architecture Evolution: Report on Technical Options and Conclusions (Release 7)", 3GPP TR 23.882 V1.9.0 (Apr. 2007).
Third Generation Partnership Project, "Technical Specification Group Services and System Aspects; 3GPP System Architecture Evolution: Report on Technical Options and Conclusions (Release 7)", 3GPP TR 23.882 V1.15.1 (Mar. 2008).
Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.0.0 (Mar. 2007).
Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.4.0 (Mar. 2008).
Third Generation Partnership Project, "Technical Specification Group GERAN; Digital cellular telecommunications system (Phase 2+); Generic access to the A/Gb interface; Stage 2 (Release 6)," 3GPP TS 43.318 V6.11.0 (Nov. 2007).
Third Generation Partnership Project, "Technical Specification Group GERAN; Digital cellular telecommunications system (Phase 2+); Generic access to the A/Gb interface; Stage 2 (Release 7)," 3GPP TS 43.318 V7.1.0 (Feb. 2007).
Third Generation Partnership Project, "Technical Specification Group GERAN; Digital cellular telecommunications system (Phase 2+); Generic access to the A/Gb interface; Stage 2 (Release 7)," 3GPP TS 43.318 V7.4.0 (Nov. 2007).
Third Generation Partnership Project, "Technical Specification Group GERAN; Digital cellular telecommunications system (Phase 2+); Generic access to the A/Gb interface; Stage 2 (Release 8)," 3GPP TS 43.318 V8.1.0 (Feb. 2008).
Third Generation Partnership Project, "Technical Specification Group Radio Access Network; Evolved Universal Terrestrial Radio Access (E-UTRA); User Equipment (UE) procedures in idle mode (Release 8)," 3GPP TS 36.304 V8.1.0 (Mar. 2008).
Third Generation Partnership Project, "Technical Specification Group Radio Access Network; Evolved Universal Terrestrial Radio Access (E-UTRA); Requirements for support of radio resource management (Release 8)," 3GPP TS 36.133 V8.1.0 (Mar. 2008).
NEC, "Measurements related to LTE handover," 3GPP TSG-RAN WG2#57bis, R2-071276, St. Julian's, Malta (Mar. 26-30, 2007).
Nokia, "New drivers for Cell reselection procedures in LTE," 3GPP TSG-RAN WG2 #56, R2-063072, Riga, Latvia (Oct.-Nov. 2006).
"New Drivers for Cell Reselection Procedures in LTE", 3GPP Tdoc R2-063072, 3GPP TSG-RAN WG2 #56 Riga, Latvia, Oct. 6-Nov. 10, 2006, 3 pages.
NEC, "Measurements related to LTE handover", 3GPP Tdoc R2-071276, 3GPP TSG-RAN WG2 Meeting #57bis, St. Julian's, Malta, Mar. 26-30, 2007, 3 pages.
3GPP TdocR2-071560, 3GPP TSG RAN WG2 #57bis, St. Julian's, Malta, Mar. 26-30, 2007, 8 pages.
"3rd Generation Partnership Project; Technical Specification Group GSM/EDGE Radio Access Network; Generic access to the A/Gb interface; Stage 2 (Release 6)", 3GPP TS 43.318 V6.9.0, Feb. 2007, 71 pages.
"Argentinian Office Action", Argentinian Patent Application No. P080101824, Jul. 25, 2012, 4 pages.
"Argentinian Office Action (English Translation)", Argentinian Patent Application No. P080101824, Jul. 25, 2012, 6 pages.
"European Office Action", European Patent Application No. 08747002.7-1857, Dec. 20, 2013, 8 pages.
"Notice of Allowance", Japanese Patent Application No. 2013-143651, Jan. 19, 2016, 3 pages.

(56) References Cited

OTHER PUBLICATIONS

"Notice of Allowance (English Translation)", Japanese Patent Application No. 2013-143651, Jan. 19, 2016, 3 pages.
"Notice of Allowance of Patent", Korean Patent Application No. 10-2014-7011929, Jul. 29, 2015, 5 pages.
"Notice of Allowance of Patent (English Translation)", Korean Patent Application No. 10-2014-7011929, Jul. 29, 2015, 1 page.
"Official Notice of Rejection", Japanese Patent Application No. 2010-506552, Jul. 27, 2012, 4 pages.
"Official Notice of Rejection (English Translation)", Japanese Patent Application No. 2010-506552, Jul. 27, 2012, 5 pages.
Orange, Telecom Italia, T-Mobile, "Requirements for LTE Home eNodeBs", 3GPP RP-070209, 3GPP TSG RAN #35, Lemesos, Cyprus, Mar. 6-9, 2007, 4 pages.

* cited by examiner

MOBILITY PROCEDURES AND DIFFERENTIATED CHARGING IN HOME NODE-BS

CROSS REFERENCE TO RELATED APPLICATIONS

This application claims the benefit of U.S. Provisional Application Nos. 60/914,865 filed Apr. 30, 2007 and 60/939,932 filed May 24, 2007, which are incorporated by reference as if fully set forth.

TECHNOLOGY FIELD

A method to implement Idle and Connected Mode mobility to and from a Home evolved Node-B (e-NB), (henceforth referred to as HNB) in a wireless environment. More particularly, the method is related to implementing mobility between a long term evolution (LTE) macro cell and HNB (bi-directional mobility), between HNBs as well as between HNBs and legacy third generation partnership project (3GPP) radio access technology (RAT), e.g., third generation (3G)/global system for mobile communications (GSM) enhanced data rates for GSM evolution (EDGE) radio access network (GERAN) (also bi-directional mobility). The apparatus is used to implement the method.

BACKGROUND

Current effort for the 3GPP LTE program is to bring new technology, new architecture and new methods in the new LTE settings and configurations in order to provide improved spectral efficiency, reduced latency, better utilizing the radio resource to bring faster user experiences and richer applications and services with less cost.

As part of these efforts, the 3GPP plans to introduce the concept of a HNB in LTE and possibly also wideband code division multiple access (WCDMA), GERAN and other cellular standards. The HNB is understood to be similar to the wireless local area network (WLAN) access point (AP) and can be designed in a manner that allows access to cellular services to users over extremely small service areas (e.g., homes or small offices). This can be particularly useful in areas where cellular networks have not been deployed and/or legacy RAT coverage exists and in areas where cellular coverage may be faint or non-existent for radio related reasons, (e.g., an underground metro or a shopping mall). The subscriber (e.g., an individual or an organization) can deploy a HNB over an area where such service is desired.

By introducing the concept of HNBs, the intent is to make HNBs ubiquitous and widely available. However, this means that several deployment scenarios should be considered. In particular the scenarios in which macro-cell coverage is unavailable either because of radio-related reasons (e.g., an underground tunnel) or because only legacy RAT coverage is available must be considered. Several issues need to be addressed for HNB implementations, some of which are set forth below.

Implementation of mobility between LTE Macro-cell and LTE HNB or between legacy 3GPP macro-cell like WCDMA and legacy 3GPP HNB (e.g., CMDA) and vice-versa when macro-cell coverage is available is an issue that should be addressed. Another issue is the implementation of mobility between HNBs. A third issue is that of implementation of mobility between LTE HNBs and legacy 3GPP RAT (e.g., WCDMA and GERAN) when LTE macro-cell coverage is unavailable. Implementation of mobility between legacy HNBs (e.g., Release 8 WCDMA) and LTE HNBs, between LTE HNBs and non-3GPP RAT (e.g., WLAN), and between legacy 3GPP HNB (e.g., WCDMA) and legacy 3GPP RATs are also valid issues.

Further, it may be possible to have hot-spot like deployments of HNB where operators (cellular or other business) choose to provide LTE coverage via HNBs in high-density areas (e.g., shopping malls, convention centers, etc.). It may be possible to implement differentiated charging policies that open new revenue streams for these operators which in turn may affect the decision of which coverage (macro-cell, HNB etc.) the wireless transmit/receive unit (WTRU)/network chooses to use. Therefore, the policies and implementation of differentiated charging mechanisms and their indication to HNBs are also open issues.

It is also implicit that the solutions to the problems mentioned above shall be consistent with the agreed requirements on mobility between LTE and other 3GPP access (e.g., GERAN, 3G), and LTE and non-3GPP access (e.g., WLAN).

Several high-level requirements exist for LTE-GERAN/universal terrestrial radio access network (UTRAN) inter-working. First, evolved UTRAN (E-UTRAN) terminals also supporting UTRAN and/or GERAN operation should be able to support measurement of, and handover from and to, both 3GPP universal terrestrial radio access (UTRA) and 3GPP GERAN systems correspondingly with acceptable impact on terminal complexity and network performance. Second, E-UTRAN is required to efficiently support inter-RAT measurements with acceptable impact on terminal complexity and network performance, e.g., by providing WTRUs with measurement opportunities through downlink and uplink scheduling. Third, the interruption time during a handover of real-time services between E-UTRAN and UTRAN is less than 300 ms. Fourth, the interruption time during a handover of non real-time services between E-UTRAN and UTRAN should be less than 500 ms. Fifth, the interruption time during a handover of real-time services between E-UTRAN and GERAN is less than 300 ms. Sixth, the interruption time during a handover of non real-time services between E-UTRAN and GERAN should be less than 500 ms. Another requirement is that non-active terminals (such as one being in Release 6 idle mode or CELL_PCH) which support UTRAN and/or GERAN in addition to E-UTRAN shall not need to monitor paging messages only from one of GERAN, UTRA or E-UTRA. The interruption time during a handover between an E-UTRA broadcast stream and a UTRAN or GERAN unicast stream providing the same service (e.g., same TV channel) is less than a value for further study (FFS). The FSS value is to be agreed upon following SA (Service and System Aspects) guidance. Finally, the interruption time during a handover between an E-UTRA broadcast stream and a UTRAN broadcast stream providing the same service (e.g., same TV channel) is less than FFS.

The above requirements are for the cases where the GERAN and/or UTRAN networks provide support for E-UTRAN handover.

Several high-level requirements also exist for LTE—non-3GPP access inter-working. First, the evolved 3GPP Mobility Management solution shall be able to accommodate terminals with different mobility requirements (e.g., fixed, nomadic and mobile terminals). Second, the evolved 3GPP mobility management should allow optimized routing for user-to-user traffic (including communication towards Internet and public switched telephone network (PSTN) users, e.g., via local break-out) and in all roaming scenarios (e.g., when both users are in a visited network). Third, the evolved 3GPP System shall support IPv4 and IPv6 connectivity. Inter-working between IPv4 and IPv6 terminals, servers and access systems shall be possible. Mobility between access systems supporting different IP versions should be supported. Finally, transport overhead needs optimization, especially for the last mile and radio interfaces.

SUMMARY

A method to implement Idle and Connected Mode mobility to and from an HNB in a cellular environment. Additional schemes can be used to implement differentiated charging when accessing HNBs.

Specifically, the criteria can be used to make a cell reselection decision when an HNB is detected, make a handoff decision, and can indicate charging and other policies/preferences and configurations to the WTRU. Different criteria and requirements for handover between HNBs Macro-cells from same or other RATs can be implemented. Criteria for HNB to HNB handovers, HNB identification ideas, basic paging criteria for HNBs, and charging policies for HNBs can be implemented. The apparatus can be used to implement these methods.

The goal is to address some high-level architecture and implementation issues that have been identified by the 3GPP RAN WG3.

BRIEF DESCRIPTION OF THE DRAWINGS

A more detailed understanding may be had from the following description, given by way of example and to be understood in conjunction with the accompanying drawing wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The solutions discussed herein are consistent with broad agreements regarding mobility between LTE and other 3GPP access (e.g., GERAN, 3G) and LTE and non-3GPP access (e.g., WLAN).

Figure 1:
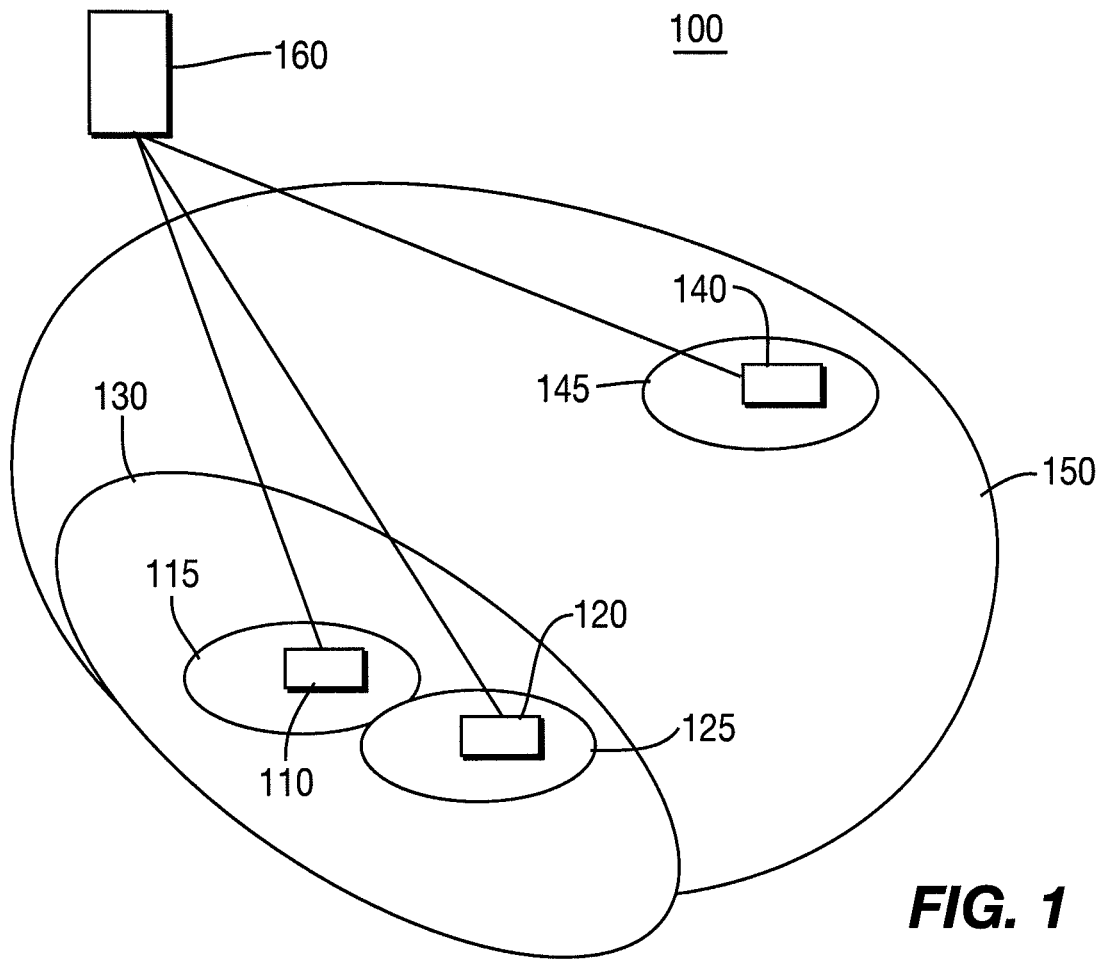
FIG. 1 is a block diagram of HNB deployment scenarios for HNBs offering LTE services.

FIG. 1 shows examples of possible HNB deployment scenarios 100 offering LTE services. In a first example, two HNBs, 110 and 120, each reside within an LTE macro-cell 130. The HNBs 110 and 120 are respectively within HNB cells 115 and 125. In another example, HNB 140 is within HNB cell 145 and resides within another 3GPP system 150. Each HNB is in communication with a higher network node 160.

WTRU/Network Preferences and their Availability to the WTRU

Several criteria shall be discussed below, that allow the WTRU to decide as to which HNB/macro-cell coverage is desirable. Often these require user/operator configuration and consequently the WTRU should be informed as to what these configurations/preferences are.

These preferences/configurations can be made available to the WTRU using any one or any combination of the following schemes: 1) stored in WTRU, e.g., in subscriber identity module (SIM), universal SIM (USIM), universal integrated circuit card (UICC) or LTE equivalent, 2) dynamically indicated by network to WTRU using explicit or implicit signaling (e.g., non-access stratus (NAS)/radio resource control (RRC)/Layer 1 (L1)/Layer 2 (L2)/IEEE 802.21 services), 3) indicated in cell broadcasts, 4) indicated in neighbor cell lists, 5) requested by WTRU (pull mechanism), 6) sent by network (push mechanism), 7) user defined, and 8) other schemes such as IEEE 802 Information Service mechanism.

Criteria for Reselection to HNB Cell

For the following criteria for making a cell reselection decision to HNBs, it is assumed that the WTRU is already in idle mode.

Non-Availability of Macro-Cell Coverage

Figure 2:
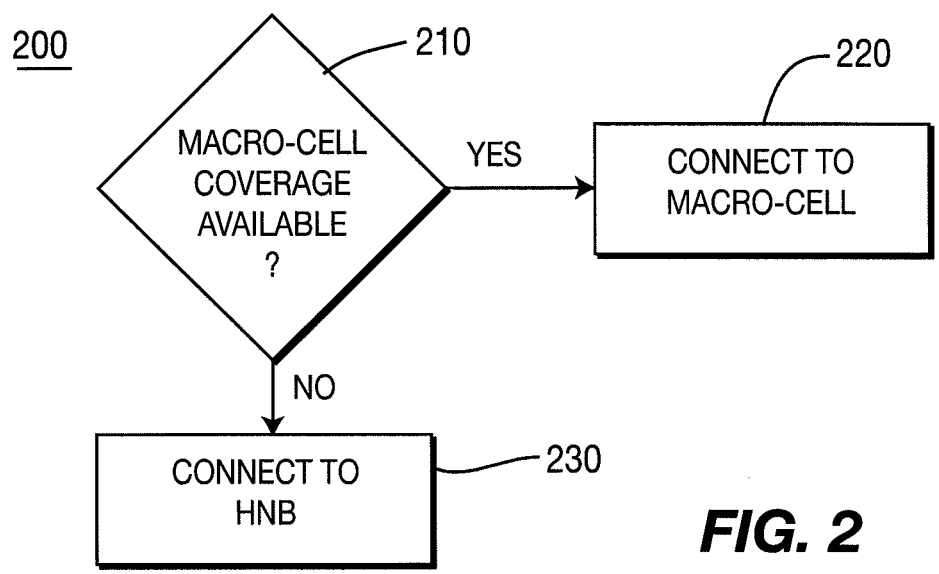
FIG. 2 is a flow diagram of WTRU connectivity procedures during non-availability of macro-cell coverage.

FIG. 2 is a flow diagram of WTRU connectivity procedures 200 during non-availability of macro-cell coverage. The WTRU determines 210 whether macro-cell coverage is available. The WTRU may wish to preferentially connect to a macro-cell (LTE or legacy 3GPP RAT) when available 220 and may connect to a HNB only when surrounding macro-cell coverage is unavailable 230. Alternatively, the WTRU may connect to an HNB when the desired macro-cell coverage is unavailable (e.g., LTE is desired and unavailable but GERAN is available). It is assumed that these preferences/configurations are made available to the WTRU.

Availability of Preferred HNB Cell Coverage

Figure 3:
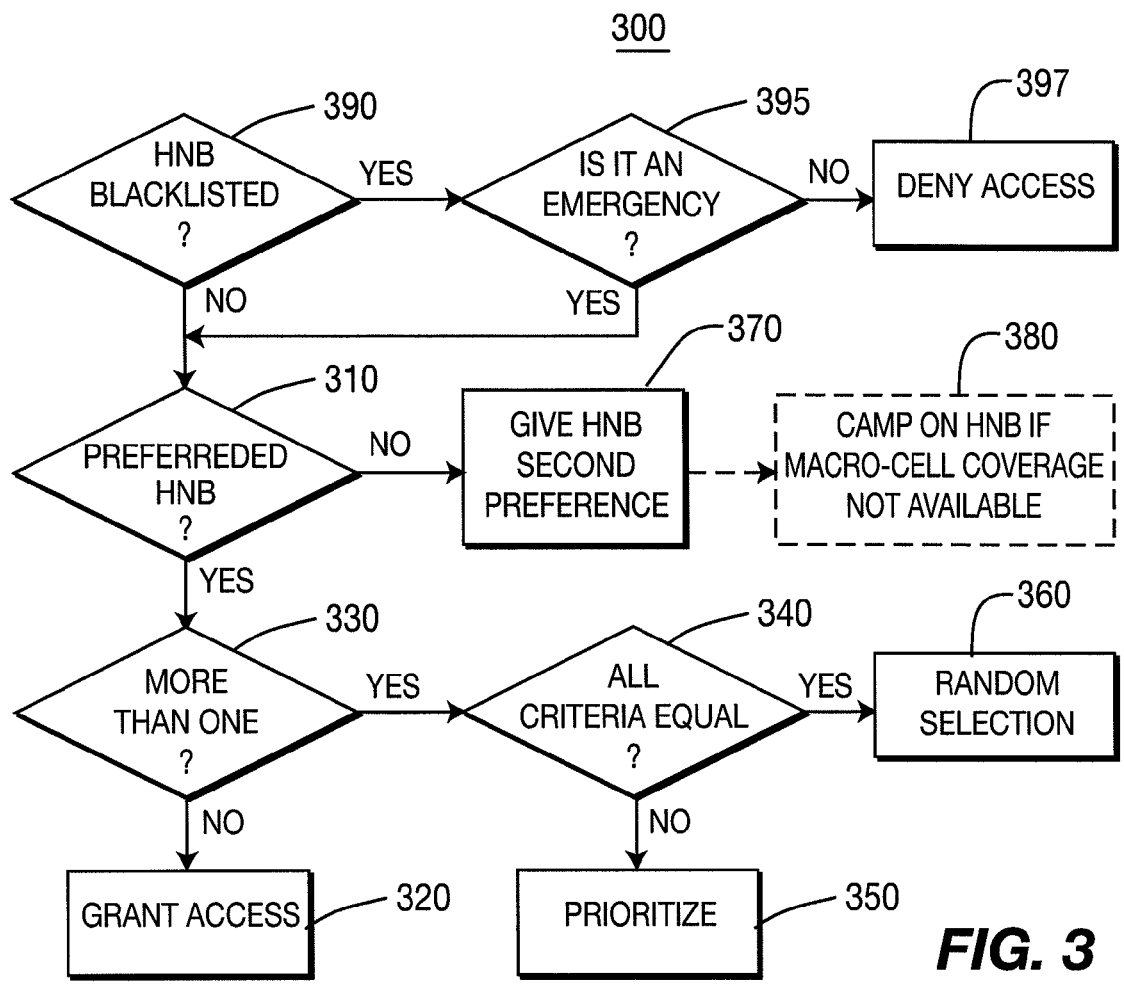
FIG. 3 is a flow diagram of WTRU connectivity procedures when preferred HNB cell coverage is available.

FIG. 3 is a flow diagram of WTRU connectivity procedures 300 when preferred HNB cell coverage is available. It is possible that certain HNBs are marked as "Preferred" for a particular WTRU. For example a user may configure HNBs in his/her home or office as being "Preferred" 310 and in which case whenever such a HNB cell coverage is available the WTRU can connect to it 320, regardless of availability of surrounding macro-cell coverage. If more than one HNB is marked as "Preferred" for a particular WTRU and are available 330, the WTRU determines whether all the selection criteria are equal 340. The WTRU may then implement a priority order 350 or may make the decision between them based on other criteria (e.g., favorable radio environment, service offered, charging policies, etc.) some of which are mentioned below or it may make the decision based on a random selection 360 if all the selection criteria are equal 340.

Alternatively, if a HNB is not "Preferred" 310, then the WTRU would give it second preference 370 (i.e., after the WTRU has tried the macro-cell). However, the WTRU can still camp on the HNB if the macro-cell coverage is not available 380. Certain HNBs can be "blacklisted" 390, however, they may still be accessed in the case of an emergency 395. If there is an emergency 395 and a HNB is not preferred 310, the WTRU would still be granted permission to access the HNB 320. If the HNB is "blacklisted" 390, and there is no emergency 395, the WTRU will be denied access 397. It is assumed that these preferences/configurations are made available to the WTRU.

Radio-Related Criteria

Figure 4:
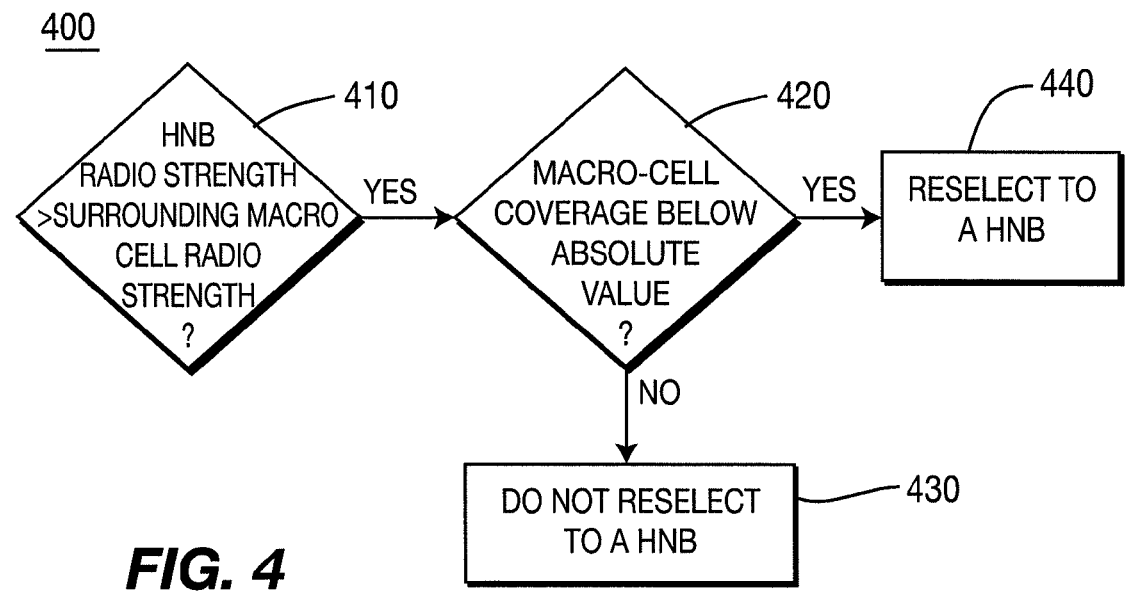
FIG. 4 is a flow diagram of reselection procedures based on HNB radio strength in relation to surrounding macro-cell radio strength.

FIG. 4 is a flow diagram of reselection procedures 400 based on HNB radio strength in relation to surrounding macro-cell radio strength. Cell reselection procedures prioritize cells based on relative cellular radio strengths. However, instead of using a relative strength measure, the WTRU can make the decision based on absolute measurements, i.e., even though the HNB radio strength may be better than the surrounding macro-cell radio strength 410, the macro-cell strength may be very good, i.e., higher than a certain absolute value. In such cases, unless the surrounding macro-cell coverage drops below a certain absolute value 420, the WTRU will not reselect to a HNB cell 430 even though the HNB cell offers a stronger physical layer connection and other parameters may indicate otherwise. If the surrounding macro-cell coverage remains at above a certain absolute value at 420, the WTRU may reselect to a HNB at 440. The absolute values may be dynamically changed based on network traffic, WTRU identity, and location in network, services offered in macro-cell versus HNB cell or other criteria. It is assumed that these preferences/configurations/values are made available to the WTRU.

Alternatively, the network may ensure that while relative comparisons are still used, the offsets for the HNBs are much higher/lower than a regular macro-cell. This ensures that the HNB cell must offer significantly better coverage than the surrounding macro-cell in order to reselect to it. For this alternative, the offset values may be dynamically changed based on network traffic, WTRU identity, and location in network, services offered in macro-cell versus HNB cell or based on other criteria and may be sent to the WTRU.

Services Available at HNB Cell

Figure 5:
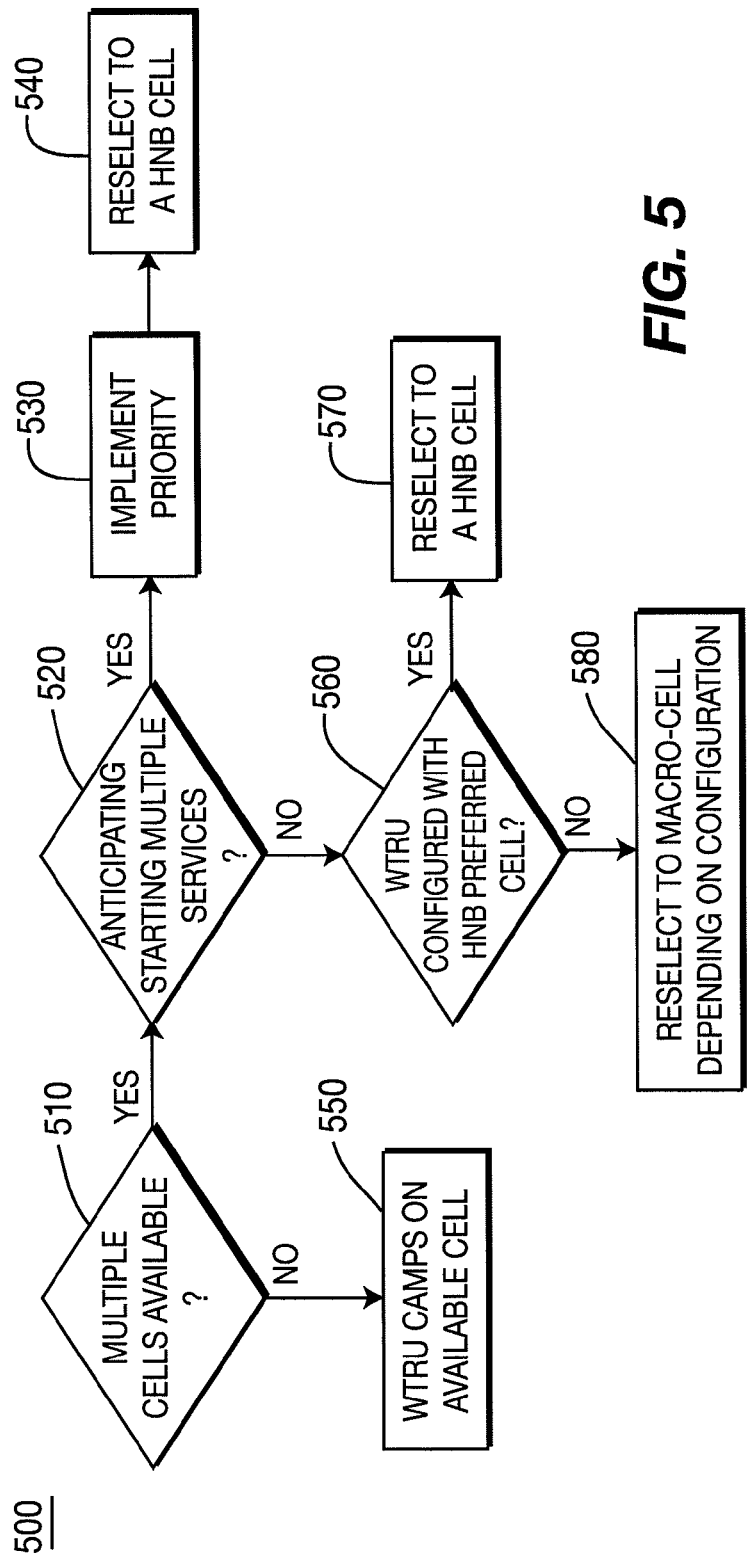
FIG. 5 is a flow diagram of reselection procedures when multiple services are available at HNB cell.

FIG. 5 is a flow diagram of reselection procedures 500 when multiple services are available at HNB cell. It is an open issue currently as to which services are offered in a HNB cell. As an example, it is possible that a WTRU in Idle Mode is awaiting the start of a particular multimedia broadcast multicast service (MBMS) and it may have already chosen the HNB. In the case where the WTRU has not already selected a HNB cell, it may choose not to reselect to the HNB cell if the HNB cell is unable to support the desired MBMS service.

Referring to FIG. 5, if multiple cells are available 510 (macro, HNB, other RAT, etc.) and the WTRU anticipates starting multiple services 520 (e.g., multiple MBMS sessions) the WTRU may implement a priority 530 for these multiple services and its decision to reselect to a HNB cell 540 (or any other cell) shall be affected by this prioritization of services. In the case where multiple cells are not available and only one cell is available 510, the WTRU will be forced to camp on the available cell to make sure it has service 550. If multiple cells are available 510 and the WTRU is not anticipating any service to begin 520, the reselection to the HNB cell will depend on what preference the WTRU has been configured with. If the WTRU has been configured with a HNB as the preferred cell 560, then it will reselect to the HNB cell as shown in FIG. 3. If the WTRU has not been configured with a HNB as the preferred cell 560, the WTRU could reselect to a macro-cell 580, depending on its configuration, as shown in FIG. 2. It is assumed that these preferences/configurations are made available to the WTRU. Also note that handover (HO) towards a HNB could be asymmetric. The WTRU could choose to allow Handovers from a HNB to the corresponding macro-cell for both IDLE and CONNECTED modes. However, the WTRU may chose to allow Handover from a macro-cell to a HNB only in IDLE mode. For example, the WTRU could chose to remain on a macro-cell while in connected mode and execute a handover towards a HNB once it goes to IDLE mode.

Operator Agreements

The cell reselection procedures should not exclude the possibility of new business arrangements between operators. For example two operators may join together so that Operator B provides Operator A with HNB coverage. While a WTRU subscribed to Operator A may not choose to roam into a surrounding macro-cell maintained by Operator B, for example, identified by the public land mobile network (PLMN) ID in cell broadcast, the WTRU may choose instead to roam into a HNB cell maintained by Operator B. It is assumed that these preferences/configurations of operators that can be selected and what kinds of cells are offered by these operators are made available to the WTRU.

Network Operator Configuration or Preference

Figure 6:
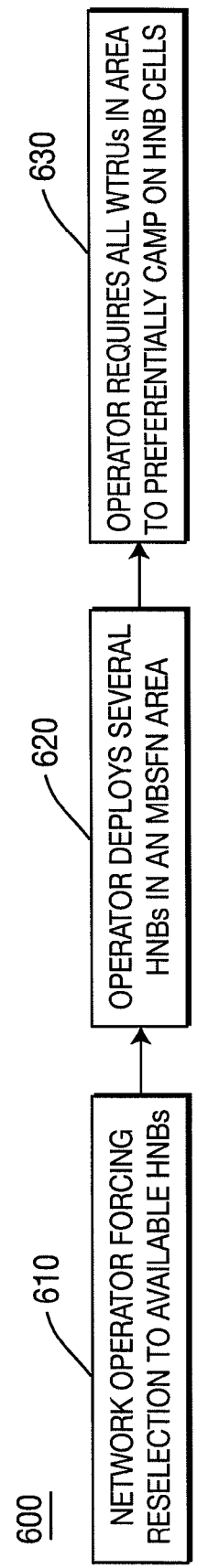
FIG. 6 is a flow diagram of a reselection procedure using network operator configurations or preferences.

FIG. 6 is a flow diagram of a reselection procedure 600 using network operator configurations or preferences. It is possible that a network operator may prefer all WTRUs in a particular area to reselect to available HNB cells 610 at a given instant of time regardless of individual WTRU preferences. As an example, an operator may deploy several HNBs 620 in an MBSFN (Multicast Broadcast Single Frequency Network) area and may require all WTRUs in that area to camp on HNB cells preferentially 630. Such a command may be sent on the broadcast channels of the macro-cell or (if individual users are to be targeted) via dedicated signaling (e.g., network access server/radio resource control (NAS/RRC)).

Figure 7:
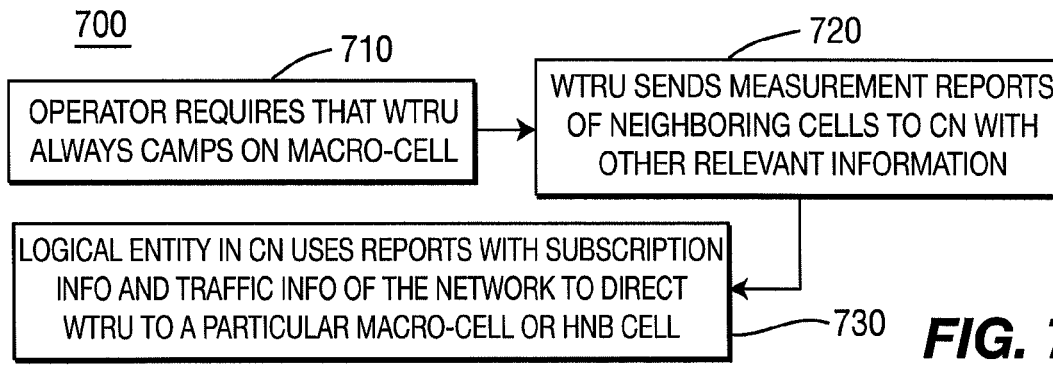
FIG. 7 is a flow diagram of a reselection procedure using network operator configurations or preferences.

FIG. 7 is a flow diagram of an alternate reselection procedure 700 using network operator configurations or preferences. The operator may require that the WTRU always camps on a macro-cell 710 and send measurement reports of neighbor cells to the core network along with other relevant information (e.g., subscriptions) 720. A logical entity in the core network (e.g., mobility management entity (MME)) may use these reports along with subscription information (e.g., stored in the home subscriber server (HSS)) and traffic information of the network (e.g., congestion, etc.) to direct the WTRU to a particular macro-cell/HNB cell 730.

Figure 8:
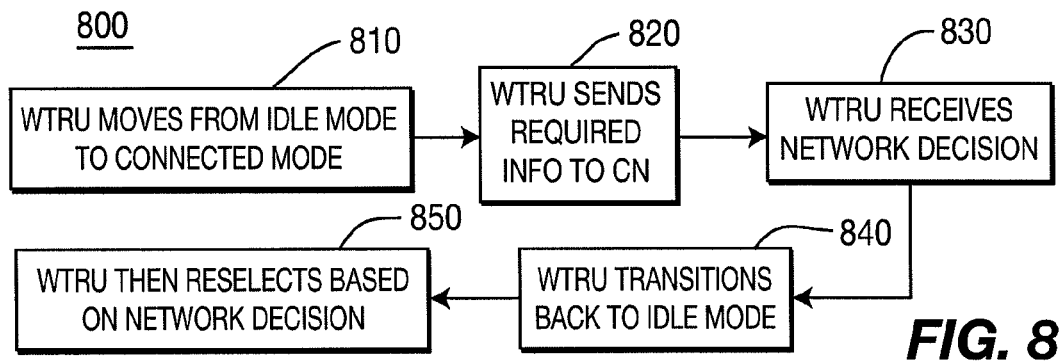
FIG. 8 is a flow diagram of a reselection procedure using network operator configurations or preferences.

FIG. 8 is a flow diagram of a third reselection procedure 800 using network operator configurations or preferences. This alternative requires the WTRU to move out of Idle Mode to Connected Mode 810, send the required information to the core network 820, receive the core network decision 830, transition back to Idle mode 840, and then reselect based on core network decision 850.

Charging Policy of HNB Cell

The HNB cell may indicate a charging policy on the cell broadcast, or the charging policy may have been indicated to the WTRU on the serving cell neighbor cell broadcast or may have been requested by the WTRU from the network, or the charging policy for the HNB may have been pre-configured in the WTRU (e.g., HNBs advertise themselves as hotspot/public HNB in cell broadcast and WTRU has configuration stored (e.g., in the Universal Subscriber Identity Module (USIM) or in the Universal Integrated Circuit Card (UICC)) that indicates that all HNBs that are public have certain rates). This can be referred to as a class based policy where HNBs belonging to certain classes (e.g., a hotspot, public for all customers in a certain shop, private, and the like) have specific rates that may or may not change. Based on these policies and WTRU preferences (e.g., connect to the cheapest available) the WTRU may reselect to a particular macro-cell/HNB cell. It is assumed that these preferences/configurations are made available to the WTRU.

WTRU Mobility

Figure 9:
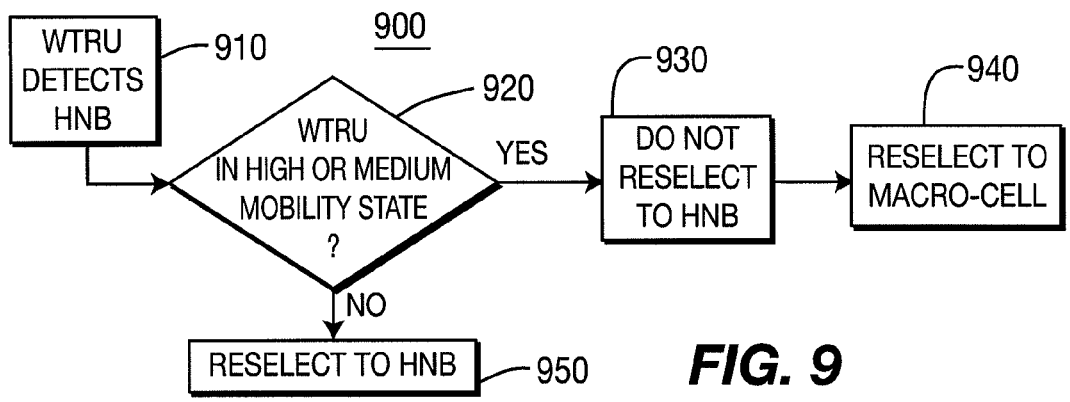
FIG. 9 is a flow diagram of reselection during various states of WTRU mobility.

FIG. 9 is a flow diagram of a reselection procedure 900 during various states of WTRU mobility. As HNB cell coverage is expected to be small (maybe a few hundred feet at most), after detecting that it is in a HNB cell 910, a WTRU that is in a high or medium mobility state 920 may choose to not reselect to a HNB 930 even though other parameters (e.g., preferences) may indicate otherwise and choose to reselect to the macro-cell 940. This is to avoid having to reselect again to a macro-cell shortly. If the WTRU is not in a high or medium mobility state 920, it may choose to reselect to a HNB 950. The detection of WTRU mobility may be left to the WTRU or may have been provided to the WTRU by some other means.

Identification of Cell

Figure 10:
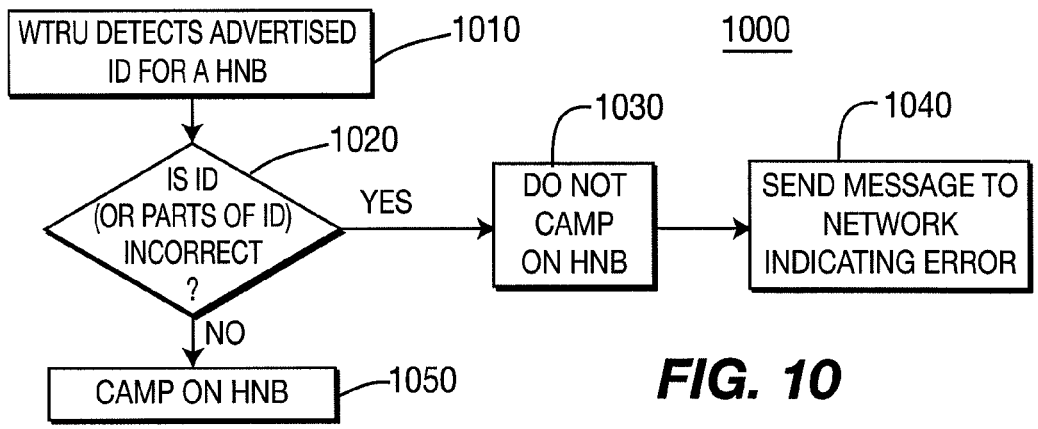
FIG. 10 is a flow diagram of HNB cell ID error detection procedures.

FIG. 10 is a flow diagram of HNB cell ID error detection procedures 1000. It may be possible that the HNB Cell Identification (ID) is different from the e-NB Cell ID. The format of the HNB Cell ID contains contextual information, i.e., certain parts of the cell ID represent certain characteristics, e.g., Operator/Region/Location, etc. If the WTRU detects that for a given HNB, the ID being advertised 1010, or parts of it, is incorrect or it detects that for a given HNB certain parameters (e.g., operator being advertised) are incorrect 1020 and are expected to be different, the WTRU may choose not to camp on such an HNB at 1030. Furthermore, such a decision may trigger a message to the network (e.g., RRC message/NAS message) that indicates this error 1040. If the ID advertised is correct, the WTRU may choose to camp on the HNB 1050.

The above criteria can be prioritized in any order and may be WTRU/user/operator specific or specific with respect to some other parameter. The priority order for these reselection criteria may be configured in the WTRU.

Mobility Between HNB and Other Cells

It is assumed that the WTRU is in Connected mode (i.e., LTE_Active mode) and that, as per generally agreed principles, the network controls the handoff. However, it may be possible for the WTRU to initiate HO using a specific Handover Request message sent, for example, as a RRC message or NAS message.

In all the handover procedures discussed below, the following criteria hold true. First, separately or in combination, the service and charging criteria play a very important role in handover and reselection. For example, a WTRU in a macro cell may not be able to provide a service which the WTRU desires and the only option to get the service may be a HNB, albeit at a very high rate. In such scenarios, the WTRU could have some predefined preference defined in its SIM which enables in the selection or handover criteria, or the WTRU could be given the on screen option for the user to select it manually. Or the User could use a particular service (e.g., voice over Internet Protocol (VoIP)) in LTE in the HNB and may have higher offsets to reselect to cells from other RATs because there could be high service interruptions in such a case.

Figure 11:
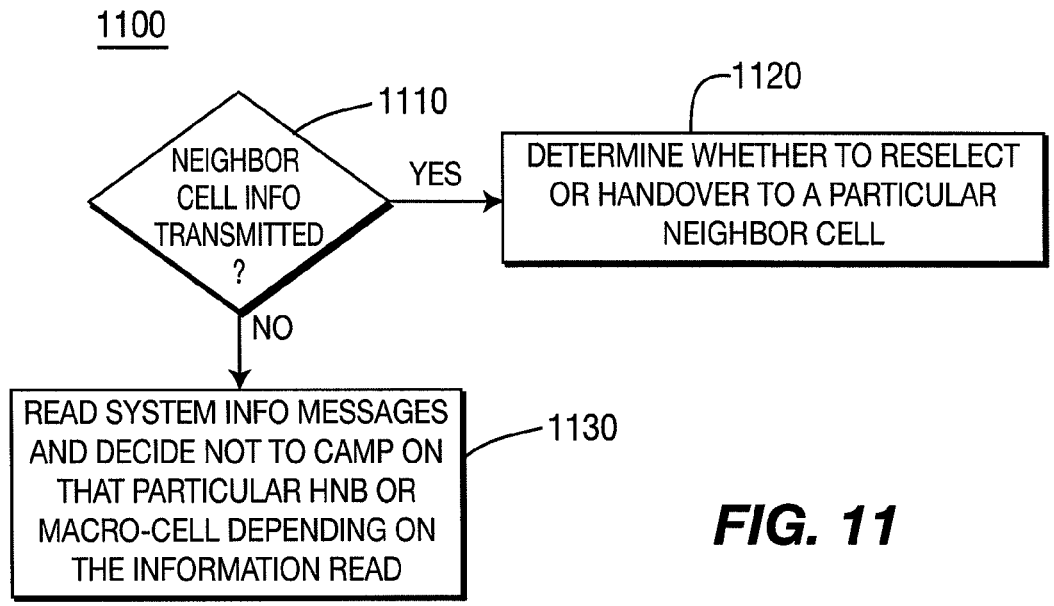
FIG. 11 is a flow diagram of a reselection procedure based on transmitted neighbor cell information.

FIG. 11 is a flow diagram of a reselection procedure 1100 based on transmitted neighbor cell information. A second factor that could be important is whether the neighbor cell information for HNB or macro-cell is transmitted by the serving cell or not. In case the neighbor cell list is transmitted with some capability information 1110, the WTRU could determine whether it wants to reselect or handover to a particular neighbor cell 1120. If neighbor cell capability information is not transmitted or no information from the neighbor list is transmitted 1110, the WTRU may then need to read the system information messages of the neighbor and may decide not to camp on that particular HNB or macro-cell depending on the information read 1130.

Also in all the intra-frequency, inter-frequency and inter-RAT reselection and handover between macro cells and HNB, similar criteria can be applied.

Mobility from HNB to Macro-Cell

LTE HNB to LTE Macro-Cell or Legacy HNB to Legacy 3GPP RAT

The criteria for reselection and handover could be for LTE macro-cell and HNB where two pairs of criteria and thresholds can be defined. The WTRU could use an appropriate criteria, depending on whether it prefers to reselect the macro cell or not (based on service and charging criteria as discussed above).

LTE HNB to Other RAT (3GPP or Non 3GPP) Macro-Cell

For deciding to reselect other RATs, the WTRU may have certain thresholds. For example, the WTRU may decide to start ranking cells on a 3GPP macro cell only when the cells or frequencies in LTE go below a particular threshold. Also the WTRU may have certain hierarchies when deciding which RAT to measure or which RAT to reselect. For example, first the other-3GPP cells may be searched or, if there is no suitable cell which comes up, then the non-3GPP (GERAN) cells may be measured. Finally other non-3GPP cells, like WLAN, may be looked to for suitable cells.

Legacy NB (Like WCDMA) to LTE or Non-3GPP RAT Macro-Cell

The criteria for cell reselection and handover in this scenario could be similar to the criteria for LTE HNB to other RAT (3GPP or non 3GPP) macro-cell reselection and handover. In this scenario, the WTRU may decide to start ranking cells on the LTE macro cell only when the cells or frequencies in the legacy RAT go below a particular threshold. Also the WTRU may have certain hierarchies when deciding which RAT to measure or which RAT to reselect. For example, first the LTE cells may be searched or, if there is no suitable cell which comes up, then the non-3GPP (GERAN) cells may be measured. Finally other non-3GPP cells, like WLAN, may be looked at for suitable cells.

Mobility from Macro-Cell to HNB

LTE Macro-Cell to LTE HNB or Legacy 3GPP RAT to Legacy HNB

Figure 12:
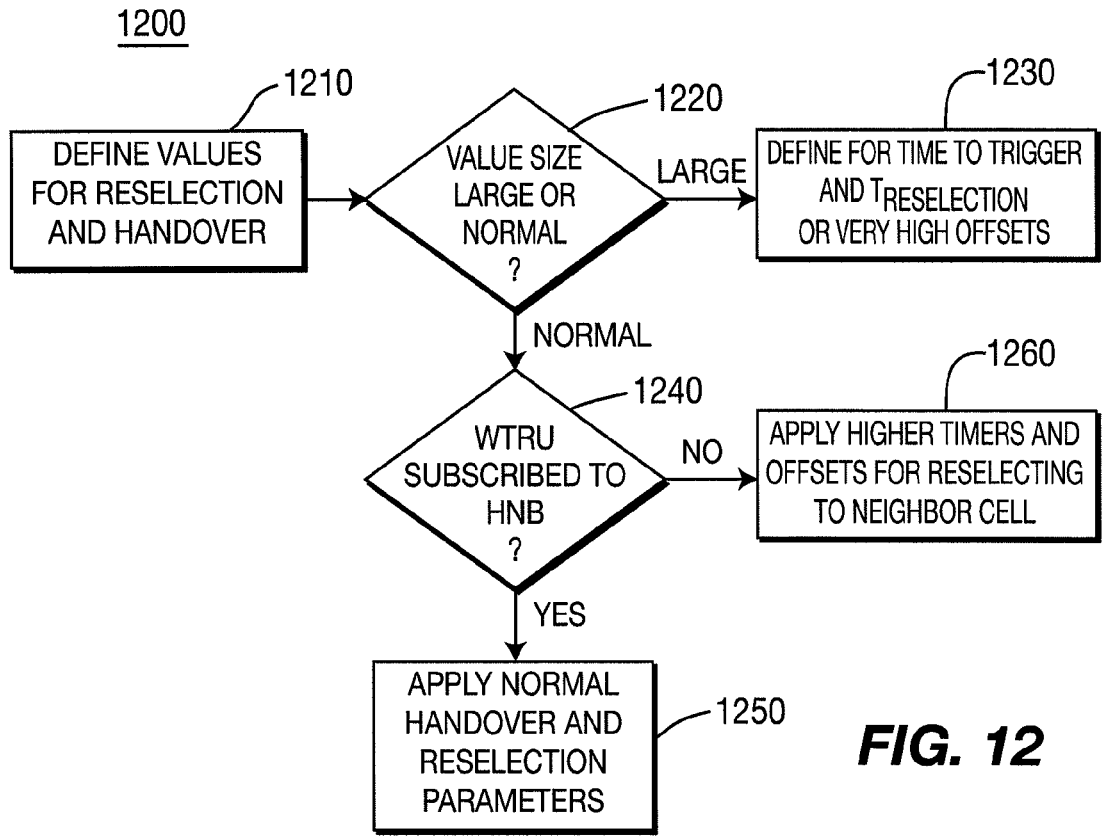
FIG. 12 is a flow diagram of a reselection and handover procedure based on defined values.

FIG. 12 is a flow diagram of a reselection and handover procedure based on defined values. When the WTRU is in a macro-cell, unless it subscribes to a HNB, it would prefer to stay in the macro cell. One alternative could be to define two pairs of values at 1210 for cell reselection and handover and determine the size of the values 1220. One set of values could be for very large values of handover and cell reselection, for example Time to trigger and T reselection, or very high offsets 1230. Another set of values could be the range of values normally signaled during a handover procedure. If the WTRU is indeed subscribed to the HNB for a particular service 1240, (the WTRU may know of it in the neighbor cell information or some RRC messages that are transmitted to it), then it can apply the normal handover and reselection parameters that it has been configured for 1250. Alternatively, the WTRU could prioritize reselection or handover to a particular HNB it is subscribed to that particular HNB. If the WTRU has not subscribed to the HNB for a particular service it can apply higher timers and offsets for reselecting to the neighbor cell 1260. It could also use an adaptive reselection and handover procedure as has been mentioned in case larger values for handover and reselection parameters are used.

Alternatively, absolute thresholds as mentioned before can be used wherein a WTRU in the macro-cell does not handover or reselect to a cell in the HNB unless the serving cell HNB falls below a particular threshold.

Paging in HNB

Figure 13:
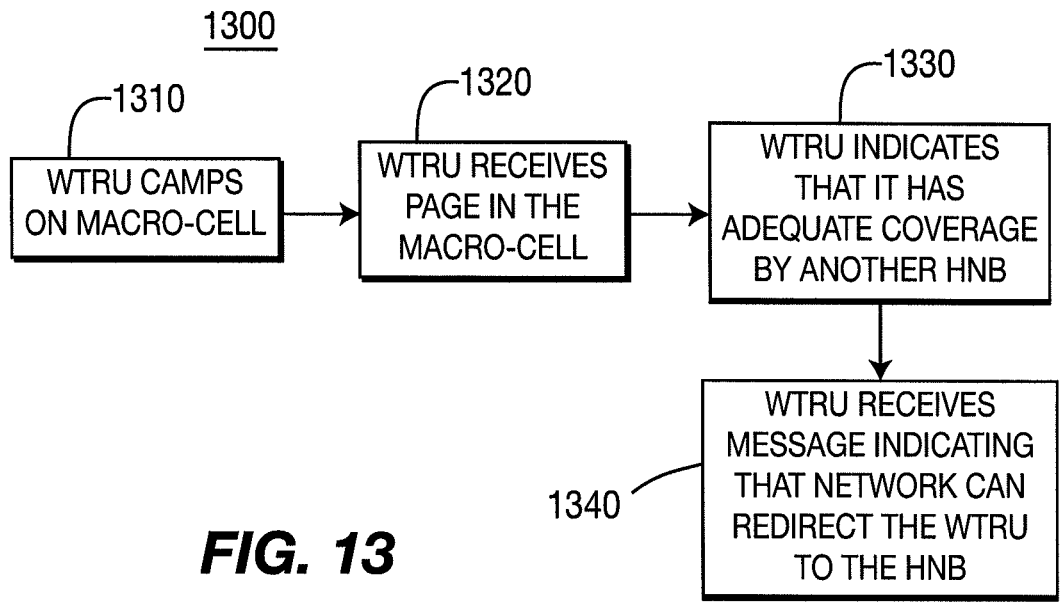
FIG. 13 is a flow diagram of a reselection procedure using paging.

FIG. 13 is a flow diagram of a reselection procedure 1300 using paging. This model supports HNB scenarios where macro cell coverage exists, so that there will be no paging inside HNB, and instead the WTRU will always camp on the macro (i.e., non-HNB) cell if one is accessible 1310. Once the WTRU receives the page in the macro-cell 1320, it can indicate along with RRC setup messages (e.g., connection request) that it has adequate coverage by another HNB (e.g., by including a measurement report) 1330. Upon receiving an indication that the network can redirect the WTRU to the HNB 1340, the WTRU may take the call in the HNB coverage area. Hence, in this model, paging is done in the "normal" LTE system, but the call is taken in the HNB coverage area.

WTRUs equipped with location functionality may choose to provide a precise location to be used as an input factor to determine the selection of an appropriate HNB. This can be performed without requiring the WTRU to measure a HNB and therefore would not require a neighbor list.

To support the cases where there is no macro cell coverage, the paging message has to be tunneled from the network to the HNB, and the WTRU will camp and get paged in the HNB coverage area. The WTRU thus may need to indicate to the macro cell, the HNB where it is reselecting and any page that is to be sent to the WTRU will be first sent to the macro cell which will then tunnel the page to the WTRU.

Other RAT Macro-Cell to LTE HUB or Other RAT Macro-Cell to Legacy 3GPP HNB

In this scenario, since cells from other RATs would normally reselect to a LTE macro cell or a legacy 3GPP macro-cell before reselecting to a HNB. However using stringent reselection criteria, the WTRU could be forced to go to a HNB only as a last alternative from another RAT macro-cell (using service, charging, higher thresholds and all other criteria as mentioned before).

Mobility Between LTE HNBs or Between Legacy 3GPP HNBs

Figure 14:
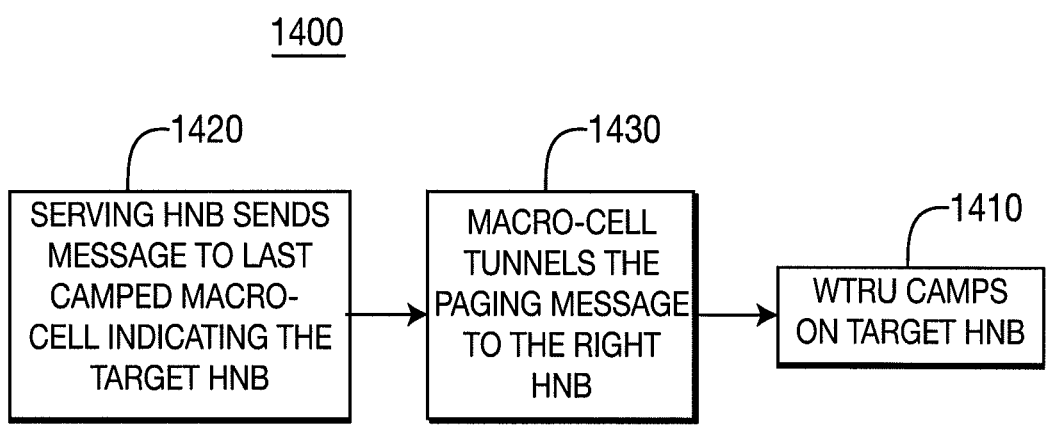
FIG. 14 is a flow diagram of a reselection procedure during WTRU mobility between LTE HNBs or between Legacy 3GPP HNBs.

FIG. 14 is a flow diagram of a reselection procedure 1400 during WTRU mobility between LTE HNBs or between Legacy 3GPP HNBs. If the services received and the charging mechanisms are similar in the two neighboring HNBs, the process of handover should be similar to the services and charging mechanisms between two neighboring macro-cells. Before camping on the target HNB 1410, the serving HNB may send a message to the last camped macro cell indicating the target HNB the WTRU is planning to pass to 1420, and, the macro cell tunnels the paging message to the correct HNB 1430.

The above described reselection and handover procedures may be minimized (by reducing the quantities to measure or increasing the interval between measurements) unless the WTRU detects (either through a neighbor cell list or through other means) that it is in the surrounding macro-cell/tracking area (TA) of the HNB to which it is subscribed. For this purpose, the WTRU may maintain a list of the surrounding HNBs to which it is subscribed and the macro-cell/TA in which it resides. Upon entering the concerned cell/TA, the WTRU may actively make measurements seeking the HNBs.

Minimizing Measurements when Transitioning from 3GPP Macro-Cell to HNB

In Active Mode

In order to minimize measurements of HNB cells while in Active mode (i.e., RRC_Connected), a WTRU that is within a 3GPP macro-cell (e.g., LTE/WCDMA etc.) may adopt one (or any combination of) the options discussed below.

Network Controlled, Assisted by HNB

It may be possible for a HNB (that operates in the same band as a surrounding macro-cell) to detect if a WTRU that it serves (i.e., those WTRUs that are configured on it) is in the vicinity. Upon detection the HNB may setup S1-C/X2/Iu/other connection (if one does not already exist) dynamically. S1-C, X2, and Iu are connections that exist between the different network entities. The S1-C is the interface between a HNB and MME (Mobility Management Entity) providing an interconnection point between the EUTRAN and the EPC. The X2 interface is the interface allowing interconnecting HNBs with each other. The Iu is the network interface between the SGSN (Serving GPRS Support Node) and the UMTS network.

Figure 15:
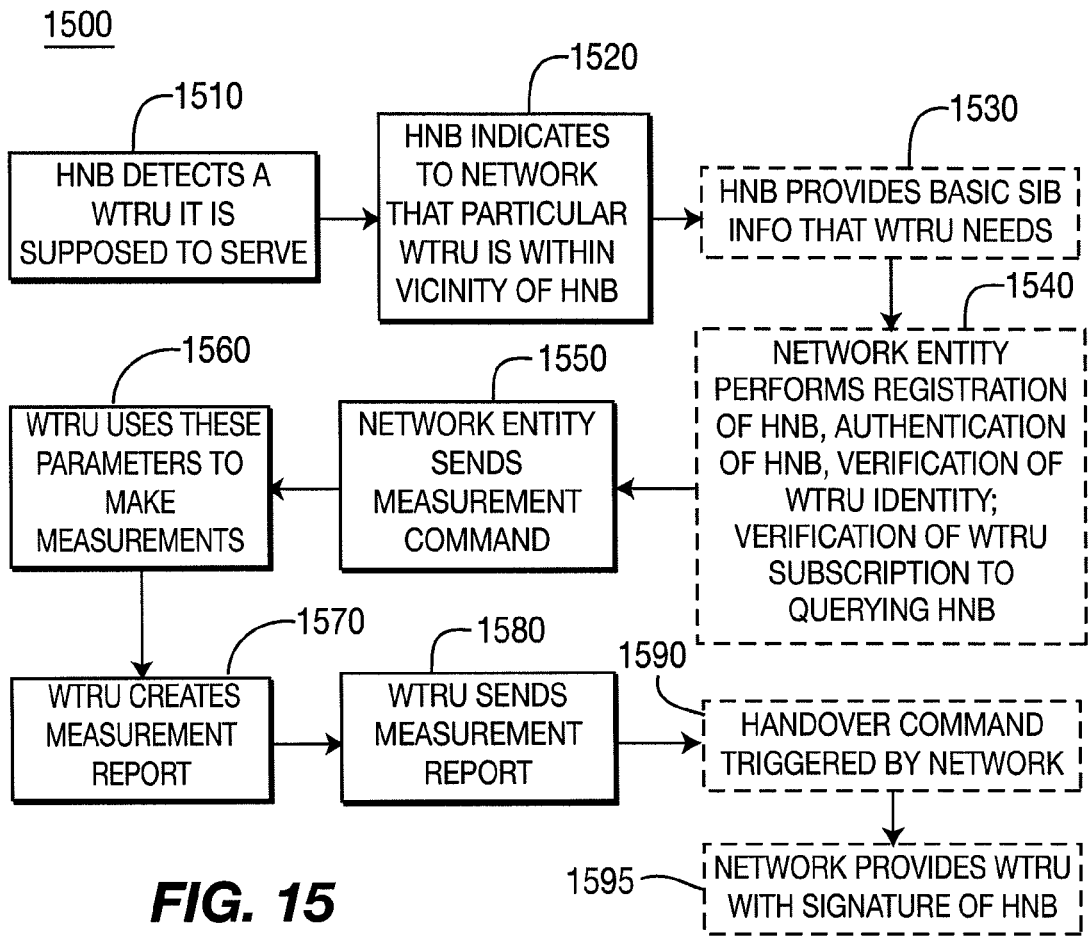
FIG. 15 is a flow diagram of an active mode network-controlled/HNB-assisted measurement reducing procedure when transitioning from a 3GPP macro-cell to a HNB.

FIG. 15 is a flow diagram of an active mode network-controlled/HNB-assisted measurement reducing procedure 1500 when transitioning from a 3GPP macro-cell to a HNB. The following procedures could be used together or in any combination.

If a HNB detects a WTRU it is supposed to serve 1510 (after waking up from a sleep cycle or otherwise), the WTRU may indicate this detection to the network 1520 (e.g., RNC, serving general packet radio service (GPRS)

support node (SGSN), MME, e-NB, NB, base station system (BSS) or other network entity). That is, the network may be informed that a particular WTRU is within the vicinity of a HNB. The WTRU identity may be an international mobile subscriber identity (IMSI), temporary mobile subscriber identity (TMSI) or some other ID. It may be a special ID for a WTRU designed for HNB access or a cell-level WTRU identity (e.g., cell radio network temporary identity (C-RNTI)). In addition, the HNB may provide the network entity with basic system information block (SIB) information 1530. This SIB information could be utilized by the WTRU to make measurements (e.g., frequency, HNB ID/cell ID, random access channel (RACH) parameters) and camp on the HNB cell. The network entity may choose to perform certain procedures at 1540 (e.g., registration of HNB, authentication of HNB, verification of WTRU identity, verification of WTRU subscription to a querying HNB) before creating and sending a measurement command to the WTRU 1550. The measurement command can be similar to existing commands and will tell the WTRU to measure the HNB cell. The WTRU will use these parameters to make measurements during a measurement period 1560, create a measurement report 1570, and provide a measurement report to the network 1580. These procedures may trigger a handover command to the HNB by the network 1590. Alternatively, the network could provide the WTRU with the signature of the HNB that may be accessed at 1595. This signature can be assigned on a per WTRU basis or group basis.

Figure 16:
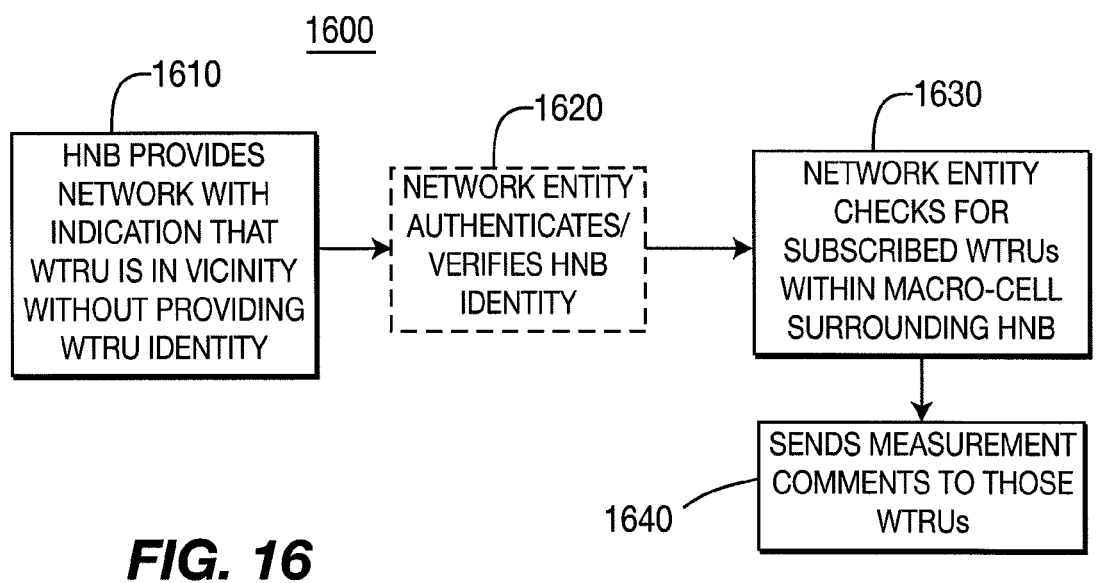
FIG. 16 is a flow diagram of an active mode network-controlled/HNB-assisted measurement reducing procedure when transitioning from a 3GPP macro-cell to a HNB.

FIG. 16 is a flow diagram of an active mode network-controlled/HNB-assisted measurement reducing procedure 1600 when transitioning from a 3GPP macro-cell to a HNB. In this example, the HNB may only provide the network with an indication that a WTRU is in the vicinity 1610 (based on, for example, received signal strength and the relevant SIB parameters) without being able to provide a specific WTRU identity. The network entity (e.g., MME), after optionally authenticating/verifying HNB identity 1620, may then check to see if any subscribed WTRUs (that are subscribed to that particular HNB) are within the macro-cell surrounding the HNB 1630. It may then create and send a measurement command to those WTRUs 1640 that are subscribed to the HNB and are within the surrounding macro-cell. The HNB in its message to the network entity may provide it with a list of the subscribed WTRUs or the network entity may determine this list in some other manner (e.g., from the HSS).

WTRU Initiated

Figure 17:
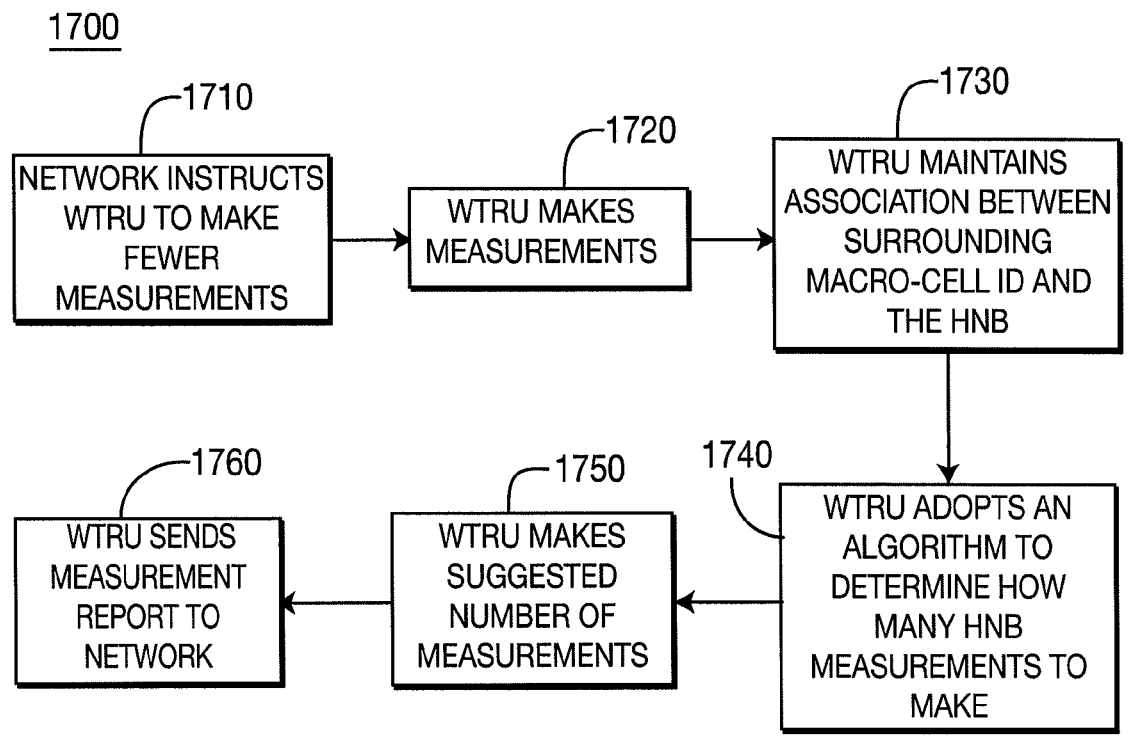
FIG. 17 is a flow diagram of an active mode WTRU-initiated measurement reducing procedure when transitioning from a 3GPP macro-cell to a HNB.

FIG. 17 is a flow diagram of an active mode WTRU-initiated measurement reducing procedure 1700 when transitioning from a 3GPP macro-cell to a HNB. In this example, the network does not instruct the WTRU as to which HNBs it should measure. The network may, however, instruct the WTRU to make a fewer number of macro-cell measurements 1710 so that it leaves the WTRU with some time to make HNB measurements. The WTRU may then make measurements of HNBs 1720, in addition to the macro-cell ones it is instructed to make by the network, when it is in the macro-cell surrounding the HNB to which it is subscribed. For this it may maintain an association between the surrounding macro-cell and the HNB 1730 and have the ability to re-configure this association. The WTRU may then adopt an algorithm 1740 that determines how many HNB measurements to make. This algorithm may take into account power levels, measurement time available and other criteria to suggest a maximum number of HNB measurements the WTRU should make. The WTRU may then make the suggested number of measurements 1750 before creating and sending a measurement report back to the network 1760.

In Idle Mode

In order to minimize measurements of HNB cells while in Idle mode (i.e., WTRU identified at Tracking Area/Routing Area level), a WTRU that is within a 3GPP macro-cell (e.g., LTE/WCDMA, etc.) may adopt the following scheme.

WTRU Initiated

In this scheme the WTRU may adopt an algorithm that determines how many HNB measurements to make. This algorithm may take into account power levels, measurement time available, surrounding macro-cell ID/Tracking Area ID/last cell and other criteria to suggest a maximum number of HNB measurements the WTRU should make. The WTRU will then make the suggested number of measurements before making the reselection decision.

Other Methods to Reduce Measurements

To reduce measurements, all the HNBs can be on a separate frequency layer. This could even be an open band like the industrial scientific medical band used for WLANs. Based on WTRU subscription, the WTRU could then decide to measure on the HNB frequency or the frequencies on which the macro cells reside. Even when the phone is started up, based on its preference it could either scan the HNB frequency layer first and camp on it or decide to not scan the HNB frequency layer at all and just scan the macro cell frequencies.

In addition the WTRU can derive the signature of a HNB using its IMSI and in combination with a signature provided within the SIB. The resulting signature is computed based on these parameters and possibly an operator provided ID common to both WTRU and HNB. For example, this ID can be passed through the provision of devices such as UICC or SIM cards common to both WTRU and HNB.

Minimizing Measurements when Transitioning from HNB to Surrounding Cells

Figure 18:
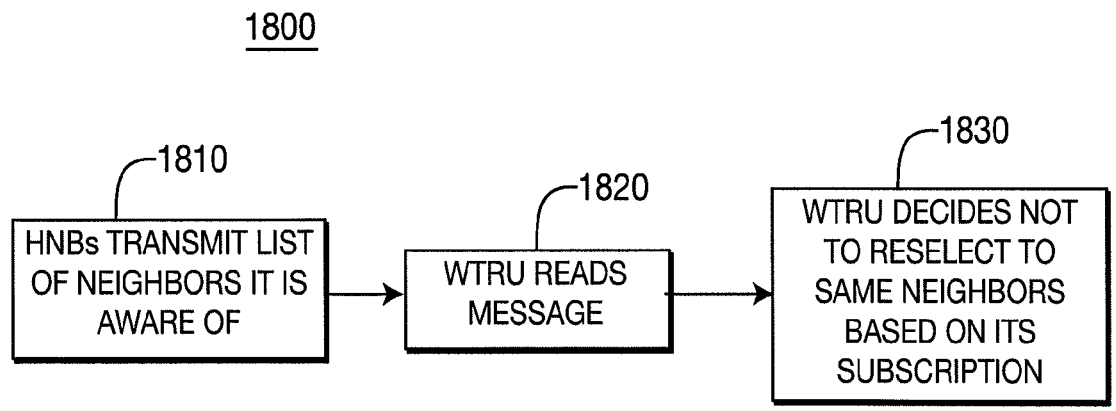
FIG. 18 is a flow diagram of an idle mode measurement reducing procedure when transitioning from a HNB to surrounding cells.

FIG. 18 is a flow diagram of an idle mode measurement reducing procedure 1800 when transitioning from a HNB to surrounding cells. To reduce measurements, the HNBs could transmit at 1810 the list of neighbors it knows about in its broadcast message along with their parameters. The WTRU could read those parameters at 1820 and decide not to reselect to some neighbor cells based on its subscription at 1830 thereby reducing the number of measurements it has to make. Alternatively, the HNB could just decide to have longer measurement cycles for the WTRU when in the HNB coverage. This could be possible since the HNB should not suffer from sudden fading scenarios considering its range of coverage and environment it is operating. Also other areas in measurements could be simplified like the filtering requirements for measurements at L1 could be made less stringent (e.g., a linear filter to interpolate measurements made could be made instead of a logarithmic filter).

Context Transfer during Handovers

Similar procedures for context transfer during handover may be used, such as faster re-initialization or transferring of the entire context.

Although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for reselection for use in a wireless transmit/receive unit (WTRU), the method comprising:
    maintaining a list of one or more identifiers (IDs) including one or more IDs indicating previously visited HNBs;
    searching for one or more candidate cells including candidate cells associated with any of the one or more IDs indicating the previously visited HNBs on non-serving frequencies;
    performing measurements on the one or more candidate cells including the candidate cells associated with any of the one or more IDs indicating the previously visited HNBs to generate selection criteria identifying one or more suitable candidate cells for reselection;
    determining whether at least one additional selection criteria associated with a characteristic of the identified one or more suitable candidate cells indicates the identified one or more suitable candidate cells has priority over a serving cell associated with a serving frequency; and
    determining whether to reselect to the identified one or more suitable candidate cells based on the serving frequency, the measurements, and the at least one additional selection criteria.

2. The method of claim 1, wherein the at least one additional selection criteria further indicates at least one of offered services, user preferences and charging policies.

3. The method of claim 1, wherein the list of one or more IDs includes an indication of priority.

4. The method of claim 1, further comprising reselecting to the identified one or more suitable candidate cells based on the determination to reselect.

5. The method of claim 4, wherein the reselecting is performed on a condition that the indication of priority of the identified one or more suitable candidate cells is a higher priority than an indication of priority of the serving cell.

6. The method of claim 5, wherein the reselecting further includes remaining on the serving cell on a condition that the indication of priority of the identified one or more suitable candidate cells is a lower priority than the indication of priority of the serving cell.

7. The method of claim 1, wherein the at least one additional selection criteria includes a random selection on a condition that all other selection criteria are equal.

8. The method of claim 1, wherein the serving cell is a macro cell.

9. The method of claim 1, wherein the serving cell is a HNB.

10. A wireless transmit/receive unit (WTRU) comprising:
    a processor configured to maintain a list of allowed Home Node B (HNB) identifiers (IDs) including HNB IDs of previously visited HNBs; and
    the processor, a transmitter, and a receiver configured to:
        search for one or more candidate cells including candidate cells associated with any of the allowed HNB IDs including the HNB IDs of the previously visited HNBs on non-serving frequencies;
        perform measurements on the one or more candidate cells including the candidate cells associated with any of the allowed HNB IDs including the HNB IDs of the previously visited HNBs to generate selection criteria identifying one or more suitable candidate cells for reselection;
        determine whether at least one additional selection criteria associated with a characteristic of the identified one or more suitable candidate cells indicates the identified one or more suitable candidate cells has priority over a serving cell associated with a serving frequency; and
        determine whether to reselect from the serving cell to the identified one or more suitable candidate cells based on the serving frequency, the measurements, and the at least one additional selection criteria.

11. The WTRU of claim 10, wherein the serving cell is a macro cell.

12. The WTRU of claim 10, wherein the serving cell is a HNB.

13. The WTRU of claim 10, wherein the list of allowed HNB IDs includes an indication of priority.

14. The WTRU of claim 10, further comprising the processor, the transmitter, and the receiver configured to reselect to the identified one or more suitable candidate cells based on the determination to reselect.

15. The WTRU of claim 14, wherein the processor, the transmitter, and the receiver are further configured to reselect on a condition that the indication of priority of the identified one or more suitable candidate cells is a higher priority than an indication of priority of the serving cell.

16. The WTRU of claim 10, wherein the at least one additional selection criteria includes an indication of services offered.

17. The WTRU of claim 10, wherein the at least one additional selection criteria includes an indication of a charging policy.

18. The WTRU of claim 10, wherein the at least one additional selection criteria includes a random selection on a condition that all other selection criteria are equal.

* * * * *